US009344739B2

United States Patent
Jeong et al.

(10) Patent No.: US 9,344,739 B2
(45) Date of Patent: *May 17, 2016

(54) METHOD OF PREDICTING MOTION VECTORS IN VIDEO CODEC IN WHICH MULTIPLE REFERENCES ARE ALLOWED, AND MOTION VECTOR ENCODING/DECODING APPARATUS USING THE SAME

(71) Applicant: NEWRACOM INC., Irvine, CA (US)

(72) Inventors: Je Chang Jeong, Seoul (KR); Soon Jong Jin, Seoul (KR); Sang Jun Park, Seoul (KR); Hyuk Lee, Seoul (KR)

(73) Assignee: NEWRACOM, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/645,868

(22) Filed: Mar. 12, 2015

(65) Prior Publication Data

US 2015/0189307 A1 Jul. 2, 2015

Related U.S. Application Data

(63) Continuation of application No. 14/282,848, filed on May 20, 2014, which is a continuation of application No. 12/977,938, filed on Dec. 23, 2010, now Pat. No. 8,855,205.

(30) Foreign Application Priority Data

May 26, 2010 (KR) .................. 10-2010-0049315

(51) Int. Cl.
*H04N 7/12* (2006.01)
*H04N 19/513* (2014.01)
(Continued)

(52) U.S. Cl.
CPC ....... *H04N 19/513* (2014.11); *H04N 19/00696* (2013.01); *H04N 19/176* (2014.11); *H04N 19/52* (2014.11); *H04N 19/527* (2014.11); *H04N 19/55* (2014.11); *H04N 19/573* (2014.11)

(58) Field of Classification Search
USPC .......................... 375/240.16, E7.027, E7.125
See application file for complete search history.

(56) References Cited

U.S. PATENT DOCUMENTS 8,369,405 B2 * 2/2013 Shi ................. H04N 19/577
375/240
8,976,865 B2 * 3/2015 Park ................. H04N 19/52
375/240.16
(Continued)

FOREIGN PATENT DOCUMENTS

KR 10-2010-0041393 A 4/2010

OTHER PUBLICATIONS

Alexis M. Tourapis, et al., "Motion Vector Prediction with Reference Frame Consideration", Proceedings of SPIE—The International Society for Optical Engineering, Jan. 2003, pp. 1-8, Proc. SPIE 5203, Society of Phot-optical Instrumentation Engineers.
(Continued)

*Primary Examiner* — Christopher S Kelley
*Assistant Examiner* — Ana Picon-Feliciano

(57) ABSTRACT

Initial value is selected when motion estimation is performed using predicted motion vector in video codec in which multiple references are allowed, and coding amount of motion vectors is reduced using predicted motion vector. Motion vector encoding apparatus includes predicted motion vector generator that generates adjacent motion vectors of current block with respect to each of reference pictures and generates each predicted motion vector of the current block from the generated adjacent motion vectors, motion estimator that determines final motion vector of the current block and final reference picture corresponding to the final motion vector with regard to search regions of the reference pictures, differential unit that obtains difference between the final motion vector of the current block and final predicted motion vector corresponding to the determined final reference picture among the predicted motion vectors, and unit for encoding information about the final reference picture and the difference.

20 Claims, 5 Drawing Sheets

(51) Int. Cl.
*H04N 19/51* (2014.01)
*H04N 19/52* (2014.01)
*H04N 19/573* (2014.01)
*H04N 19/527* (2014.01)
*H04N 19/55* (2014.01)
*H04N 19/176* (2014.01)

(56) References Cited

U.S. PATENT DOCUMENTS

| | | | |
|---|---|---|---|
| 2004/0081238 A1* | 4/2004 | Parhy | 375/240.16 |
| 2004/0101058 A1* | 5/2004 | Sasai et al. | 375/240.26 |
| 2004/0146109 A1* | 7/2004 | Kondo | H04N 19/105 375/240.16 |
| 2004/0247031 A1* | 12/2004 | Hagai | H04N 19/577 375/240.16 |
| 2005/0195324 A1 | 9/2005 | Lee | |
| 2007/0133891 A1 | 6/2007 | Jeong | |
| 2007/0153897 A1* | 7/2007 | Yan | 375/240.16 |
| 2008/0063065 A1 | 3/2008 | Lin | |
| 2008/0107180 A1 | 5/2008 | Lee et al. | |
| 2008/0175322 A1* | 7/2008 | Lee | H04N 19/523 375/240.16 |
| 2008/0240242 A1 | 10/2008 | Lainema | |
| 2009/0092188 A1 | 4/2009 | Lee et al. | |
| 2009/0296812 A1 | 12/2009 | Kim et al. | |
| 2011/0002389 A1* | 1/2011 | Xu | H04N 19/61 375/240.16 |
| 2011/0002390 A1* | 1/2011 | Chiu | H04N 19/56 375/240.16 |
| 2011/0013853 A1 | 1/2011 | Chen | |
| 2011/0090964 A1* | 4/2011 | Xu | H04N 5/144 375/240.16 |
| 2011/0158314 A1 | 6/2011 | Jeong et al. | |

OTHER PUBLICATIONS

Peisong Chenn et al., "Video Coding Using Extended Block Sizes", ITU COM16-C123-E, Jan. 2009, pp. 1-4, International Telecommunication Union.

* cited by examiner

METHOD OF PREDICTING MOTION VECTORS IN VIDEO CODEC IN WHICH MULTIPLE REFERENCES ARE ALLOWED, AND MOTION VECTOR ENCODING/DECODING APPARATUS USING THE SAME

RELATED APPLICATIONS

This application is a continuation of U.S. application Ser. No. 14/282,848 filed on May 20, 2014, which is a continuation of U.S. application Ser. No. 12/977,938, filed Dec. 23, 2010, now issued as U.S. Pat. No. 8,855,205, which claims priority under 35 U.S.C. §119 or 365 to Korean Patent Application No. 10-2010-0049315, filed May 26, 2010. The entire teachings of the above applications are incorporated by reference.

BACKGROUND

1. Technical Field

Example embodiments of the present invention relates to a video coding method and, more particularly, to methods and apparatuses for encoding and decoding motion vectors in a video codec in which multiple references pictures are allowed.

2. Related Art

With the development of telecommunication technologies including the Internet, video communication is increasing in addition to text communication and voice communication. To satisfy the various desires of consumers with existing text-based communication is insufficient. Thus, multimedia service capable of covering various types of information such as text, image, music, etc. is increasing. Multimedia data requires a high-capacity storage medium due to its enormous volume, and a wide bandwidth when transmitted. Thus, to transmit the multimedia data including text, video, and audio, it is essential to use a compression coding technique.

A fundamental principle of compressing data is based on a process of eliminating the redundancy from data. The data can be compressed by eliminating spatial redundancy referring to repetition of the same color or object in an image, temporal redundancy referring to little or nothing of variation between neighboring frames in a moving picture frame or successive repetition of same sounds in audio or psycho-visual redundancy referring to dullness of human vision and sensation to high frequencies.

To standardize the technique for compressing a moving picture, there appear various video coding standards such as Moving Picture Experts Group-2 (MPEG-2), MPEG-4, H.264 and so on. As shown in FIG. 1, all video coding technologies employ a technique called block motion estimation in order to eliminate temporal redundancy between neighboring video frames.

For example, to encode a certain block 12 within a current frame 10, a reference frame 15, whose position is different in time from that of the current frame 10, is searched for a block 17 matched with the block 12. Then, a residual between the block 12 of the current frame 10 and the block 17 of the reference frame 15 is obtained. This residual is encoded to enhance encoding efficiency. Here, a displacement between the blocks is indicated by a motion vector. Motion compensation for the reference frame 15 is made by the motion vector.

In this manner, the motion estimation process of obtaining the motion vector of the current block 12 takes a considerable amount of calculation in an entire video encoding process. Particularly, H.264, the recent video coding standard, employs a variable block size ranging from 4×4 to 16×16 in inter-frame coding or inter-picture coding. This technique shows that coding efficiency is considerably improved compared to a conventional technique of coding a macroblock (MB) having a fixed size, but it has a disadvantage in that the amount of calculation is increased tremendously because the process of searching for the motion vector should be performed on all the blocks having a variable block size. This increase in the amount of calculation may become a problem, particularly, in applications required to reduce the time difference between an encoder and a decoder such as real-time broadcasting, real-time video conferencing, and so on.

Thus, many studies are being made of the motion estimation process to reduce the amount of calculation in order to provide fast motion estimation. As a part of these studies, an early termination technique, a hierarchical search method, or a block mode skip method is known.

FIG. 2 shows a concept of searching for a motion vector on the basis of a search initial value (search initial location). In general, motion estimation is a process of searching a reference frame 20 for a region that is best matched with a current block (i.e. a block intended to search for a current motion vector) while moving within a predetermined search region 22 in a unit of pixel or sub-pixel. Here, a displacement between the current block and the searching region is nothing but a motion vector of the current block.

However, if it is possible to know a predicted motion vector of the current block before the motion estimation is performed, it is possible to reduce the amount of calculation of the motion estimation by performing the motion estimation adopting a location 24 to which the predicted motion vector points from a location 26 of the block as the search initial value. This is based on the prediction that the final determined motion vector will have a small difference from the predicted motion vector. Further, if it is possible to know the predicted motion vector, it is possible to reduce the amount of coding of the initial value of the motion vector as well as the motion vector per se. In typical video coding technologies, the motion vector is not directly transmitted to a motion vector decoding apparatus, but the difference between the motion vector and the predicted motion vector is transmitted to the motion vector decoding apparatus. This difference is called a motion vector difference (MVD). It is natural that, as the predicted motion vector becomes similar to a real motion vector, MVD approaches 0 (zero), and coding efficiency is improved.

SUMMARY

Example embodiments of the present invention are directed to more accurately set a search initial value in the event of motion estimation to reduce the amount of calculation in the motion estimation by finding more accurate predicted motion vectors in a video codec in which multiple references are allowed.

Example embodiments of the present invention is also directed to reduce the coding amount of motion vectors to increase coding efficiency by finding more accurate predicted motion vectors in a video codec in which multiple references are allowed.

It is to be understood that technical problems to be solved by the present invention are not limited to the aforementioned technical problems, and other technical problems which are not mentioned will be apparent from the following description to the person with an ordinary skill in the art to which the present invention pertains.

In some example embodiments, there is provided a motion vector encoding apparatus, which comprises: a predicted motion vector generator that generates adjacent motion vectors of a current block with respect to each of a plurality of reference pictures and generates each predicted motion vector of the current block from the generated adjacent motion vectors; a motion estimator that determines a final motion vector of the current block and a final reference picture corresponding to the final motion vector for search regions of the plurality of reference pictures; a differential unit that obtains the difference between the final motion vector of the current block and the final predicted motion vector corresponding to the determined final reference picture among the predicted motion vectors; and means for encoding information about the final reference picture and the difference.

In other example embodiments, there is provided a motion vector decoding apparatus, which comprises: an entropy encoder that losslessly encodes an input bitstream to obtain a motion vector difference associated with a current block and a reference picture number; a predicted motion vector generator that generates adjacent motion vectors of the current block on a reference picture corresponding to the reference picture number using motion vectors of neighboring blocks of the current block and generates each predicted motion vector of the current block from the generated adjacent motion vectors; and an adder that adds the motion vector difference and the generated predicted motion vector of the current block.

BRIEF DESCRIPTION OF THE DRAWINGS

The above and other objects, features and advantages of example embodiments of the present invention will become more apparent to those of ordinary skill in the art by describing in detail example embodiments thereof with reference to the attached drawings, in which.

DETAILED DESCRIPTION OF EXAMPLE EMBODIMENTS

Figure 1:
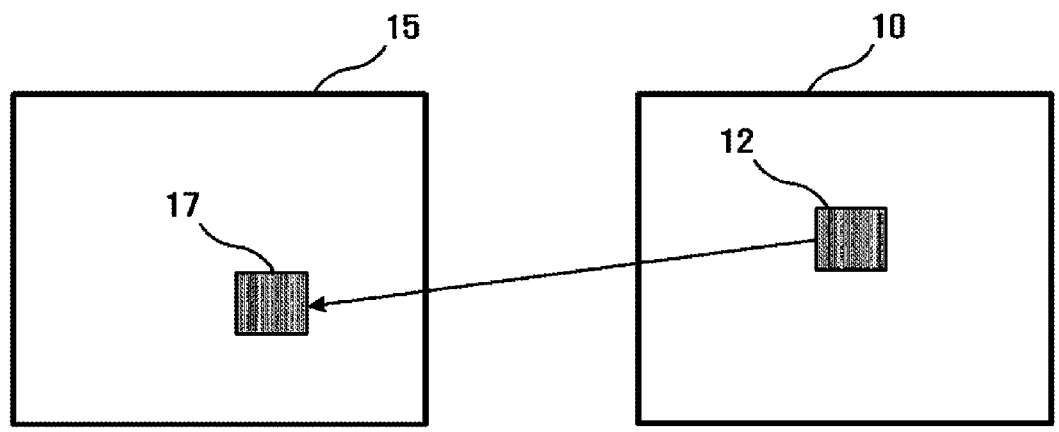
FIG. 1 shows a basic concept of inter-frame coding (or inter picture coding) using a block motion estimation technique.

Hereinafter, example embodiments of the present invention will be described in detail. The above and other objects, features and advantages of example embodiment of the present invention will become more apparent to those of ordinary skill in the art by describing in detail example embodiments thereof with reference to the attached drawings. However, example embodiment of the present invention is not limited to the embodiments disclosed below, but can be implemented in various forms. Rather, these embodiments are provided so that this disclosure will be thorough and complete, and will fully convey the scope of the invention to those skilled in the art. The scope of the invention is merely defined by the appended claims and its equivalents. In the following detailed description, the same reference numeral will be used for the same component or components regardless of the figures in order to facilitate understanding of example embodiments of the invention.

Figure 3:
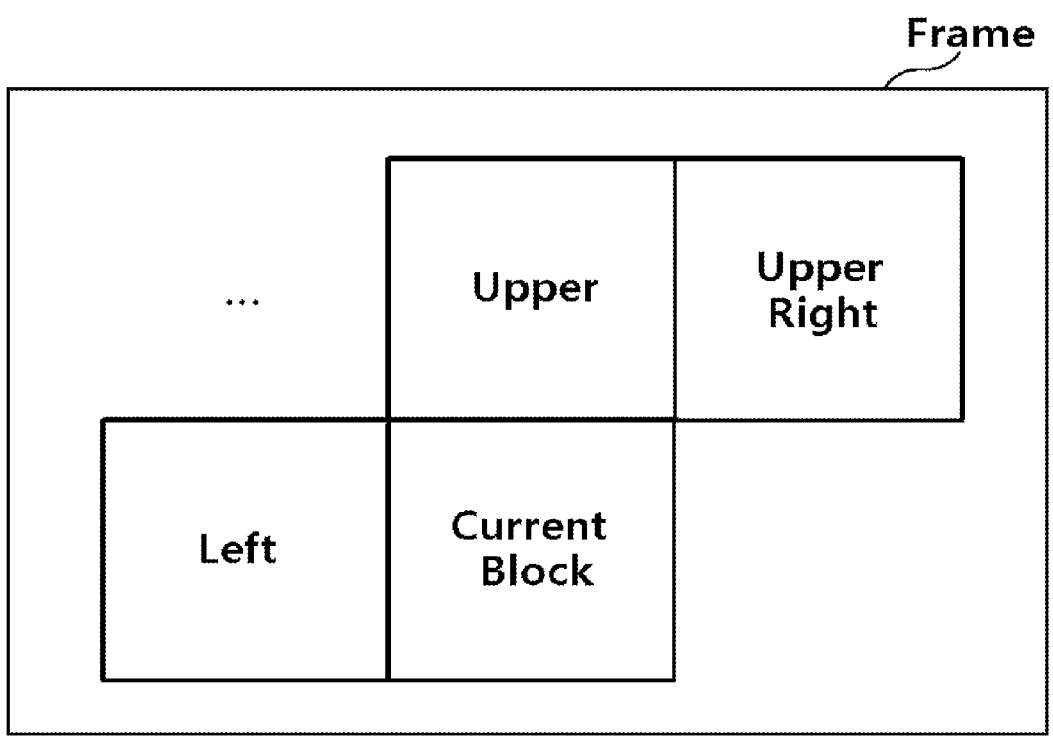
FIG. 3 shows the relationship between a current block that is to determine a motion vector and neighboring blocks where the motion vector has already been determined.

FIG. 3 shows an example of a method of obtaining a predicted motion vector. The predicted motion vector can be obtained using motion vectors of blocks, i.e. a left block "Left", an upper block "Upper", and an upper right block "UpperRight", among blocks located around a current block, wherein the motion vectors have already been determined. In detail, the predicted motion vector can be obtained through median calculation as shown in Equation 1 below. This median calculation is used for a best predicted value because it is robust against noise.

$$MV_{Median}=\text{median}(MV_{Left}, MV_{Upper}, MV_{UpperRight}) \quad \text{[Equation 1]}$$

However, in a video coding standard that does not allow multiple references, the motion vectors of the neighboring blocks can be obtained from a single reference frame. As such, three adjacent motion vectors can always be obtained, and thus the predicted motion vector can be obtained by applying the median calculation to the obtained result.

However, in a video coding standard that allows multiple references, the motion vectors of the neighboring blocks can be obtained from different reference frames. As such, all three motion vectors are not often present when based on a single reference frame. In a specific reference frame, when only some of the three adjacent motion vectors are present, the predicted motion vector may be obtained using only some of the three adjacent motion vectors. When no adjacent motion vectors are present, a limited method of, for instance, setting the predicted motion vector to a zero vector may be used.

How much the predicted motion vector is similar to the real motion vector to be obtained has a direct influence on the speed of motion estimation as well as video coding efficiency. For this reason, the limited method as described above can be insufficient. In particular, when the motion estimation of the variable block size is performed like H.264, complexity of the motion estimation is very high, and the coding amount of the motion vector increases compared to that of texture data. As such, it can be more important to obtain a more accurate predicted motion vector.

A motion vector decoding method in a video coding scheme in which multiple references are allowed according to another example embodiment of the present invention will be described below.

Figure 4:
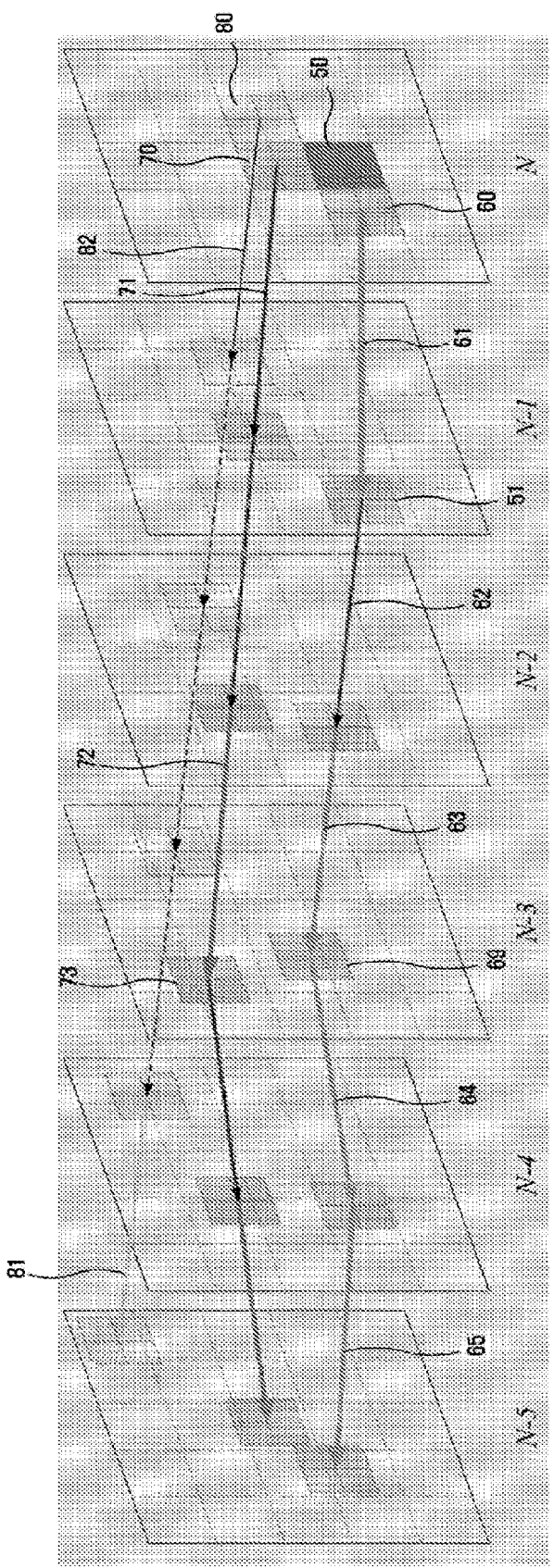
FIG. 4 illustrates a basic concept of example embodiment of the present invention.

FIG. 4 illustrates a fundamental concept of example embodiment of the present invention. Neighboring blocks 60, 70 and 80 are located around a current block 50 of a current frame or picture N. These neighboring blocks 60, 70 and 80 have final motion vectors that have already been determined. When referring to multiple frames (or pictures), a frame (or a picture) to which reference is made to obtain the final motion vector, i.e. a final reference frame (or a final reference picture), should be determined along with the final motion vector. Here, the sizes of the current block and the neighboring block may have various sizes, but they can be thought to be 8×8, a unit of selecting the reference frame. In other words, the unit in which the motion vector is allocated in H.264 is maximum 4×4, but the reference frame is at least considered to be selected in units of 8×8. Of course, one motion vector is indicated for the 8×8 block in FIG. 4. However, when the motion vector is allocated to a block subdivided so as to be smaller than the 8×8 block, it can be thought to be a representative value (average, median, etc.) of the subdivided motion vectors.

In FIG. 4, it is assumed that the final reference frame of the neighboring block 60 is N−1, the final reference frame of the neighboring block 70 is N−3, and the final reference frame of the neighboring block 80 is N−5. In this case, only a motion vector 61 of the neighbor block 60 is present in the frame N−1, only a motion vector 72 of the neighboring block 70 is present in the frame N−3, and only a motion vector 81 of the neighboring block 80 is present in the frame N−5. Further, no motion vector of the neighboring block is present in the frames N−2 and N−4.

To actually determine the final motion vector and the final reference frame of the current block 50, the motion vectors are obtained by performing the motion estimation on each reference frame, an optimal one of the obtained motion vectors is determined as the final motion vector (and it is natural that a frame where the final motion vector is determined becomes the final reference frame). To perform the motion estimation on each reference frame, it is important to select an initial value of motion search. The number of motion vectors of the neighboring blocks (i.e., the number of adjacent motion vectors) for obtaining the predicted motion vector to be used as the initial value may be less than three or none. Thus, according to a conventional video coding standard, it can be found that it is difficult to accurately determine the predicted motion vector.

As such, as described above, example embodiment of the present invention is focused on the fact that each reference frame is adapted to have all of a predetermined number (e.g. three) of adjacent motion vectors so as to be able to more accurately generate the predicted motion vector. To this end, on the basis of the adjacent motion vectors that are present now, a process of interpolating the corresponding adjacent motion vectors in the reference frame where no adjacent motion vectors are present is required.

The interpolating process may be performed by two methods as follows.

First, when a reference distance of the motion vector of the neighboring block is equal to or greater than an interval between one reference frame and the current block, the adjacent motion vector is generated by a value made by multiplying the motion vector of the neighboring block by a ratio dividing the interval by the reference distance.

In FIG. 4, the reference distance of the motion vector 81 of the neighboring block 80 (i.e. the reference distance between the frames N−5 and N) is 5. For example, the adjacent motion vector in the frame N−1 is obtained by a value (i.e. the motion vector 82) made by multiplying the motion vector 81 by a ratio dividing the interval, i.e. 1, between the frame N−1 and the current frame N (or the current block) by the reference distance, i.e. 5. Similarly, the adjacent motion vectors in the frames N−2, N−3 and N−4 are also obtained by values made by multiplying the motion vector 81 by ⅖, ⅗ and ⅘, respectively.

Second, when a reference distance of the motion vector of the neighboring block is less than an interval between one reference frame and the current block, the adjacent motion vector is generated by continuously tracing a location to which the motion vector of the neighboring block points.

In FIG. 4, the motion vector 61 of the neighboring block 60 has the reference distance of 1. Thus, the continuously tracing process is used to generate the adjacent motion vectors in the frames N−2 through N−5. In the continuously tracing process, for example, a location on the frame N−1 to which the motion vector 61 points is shifted to a location on the frame N−2 by a motion vector 62 thereof, to a location on the frame N−3 by a motion vector 63 of the location on the frame N−2, to a location on the frame N−4 by a motion vector 64 of the location on the frame N−3, and finally to a location on the frame N−5 by a motion vector 65 of the location on the frame N−4. Here, the motion vector of a certain location refers to the motion vector of the block including such a location. Meanwhile, the location on the frame N−2 is a location corresponding to ½ of the motion vector 63. In this way, by using the continuous tracing, it is possible to determine regions (quadrilateral parts indicated by an orange color) corresponding to the neighboring block 60 on all the reference frames N−1 through N−5. When all the corresponding regions are determined in this way, a displacement from the current frame N to the center of each corresponding region is just determined as the adjacent motion vector in the corresponding frame.

Of course, the two interpolating methods may be simultaneously used as in the neighboring block 70. The motion vector 72 of the neighboring block 70 points to a region 73 on the frame N−3. The adjacent motion vector on the frame N−2 and the adjacent motion vector on the frame N−1 are calculated by ⅔ and ⅓ of the motion vector 72, respectively. In the remaining reference frames above N−4, the adjacent motion vectors can be calculated by the continuous tracing.

To sum up, the neighboring blocks 60, 70 and 80 have the corresponding regions (indicated by the same color) in all the reference frames, and the displacements between the neighboring blocks and the corresponding regions exactly become the adjacent motion vectors associated with the corresponding neighboring blocks in the specific reference frame. Thus, it is possible to obtain the adjacent motion vectors on all the reference frames by means of this interpolating process.

Accordingly, when the motion estimation is performed on the current block 50 on the reference frames, the predicted motion vector can be obtained from three adjacent motion vectors on the corresponding reference frame. That is, it is possible to obtain one predicted motion vector per reference frame. The motion vectors of the corresponding reference frame are obtained by performing the motion estimation adopting this predicted motion vector as an initial value. Among the motion vectors obtained by the motion estimation in this way, one is selected and adopted as a final motion vector. Of course, as a criterion of selecting the final motion vector, a known method such as sum of absolute differences (SAD) or rate-distortion cost may be used.

The final motion vector of the current block 50 is obtained as a set along with a specific reference frame. For example, if the motion vector obtained in the frame N−1 is most suitable for the current block 50, information that should be coded, i.e. information that should be transmitted to a motion vector decoding apparatus, is the obtained final motion vector and a number of the final reference frame (the frame N−1).

To more efficiently compress this final motion vector, a more accurate predicted motion vector should be obtained from information that can be used in common by a video encoder and a motion vector decoding apparatus. As described above, in example embodiment of the present invention, since the predicted motion vector has already been obtained with respect to all the reference frames, the predicted motion vector of the final reference frame (i.e. the final predicted motion vector) belongs to information that has already been known. Thus, a difference between the final motion vector of the current block 50 and the final predicted motion vector is obtained and coded. Thereby, it is possible to enhance coding efficiency. As the difference between the final motion vector and the final predicted motion vector becomes smaller, coding efficiency becomes higher. In example embodiment of the present invention, unlike the related art, the adjacent motion vectors are determined in all the frames, and then the predicted motion vector is obtained from the determined adjacent motion vectors. As such, there is a high possibility of reducing the magnitude of the difference.

Figure 5:
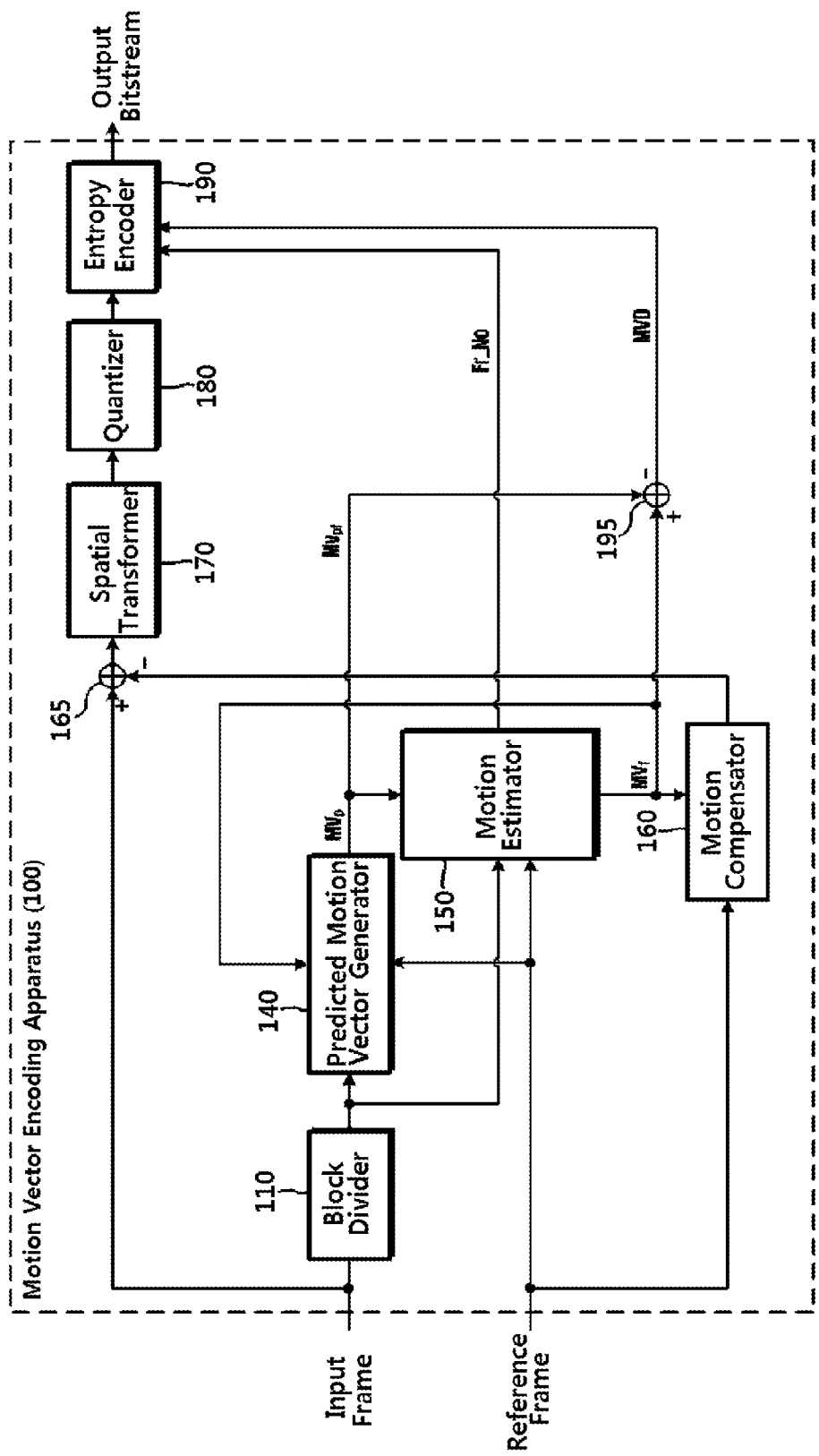
FIG. 5 is a block diagram showing construction of a motion vector encoding apparatus using a predicted motion vector according to an example embodiment of the present invention.

FIG. 5 is a block diagram showing construction of a motion vector encoding apparatus 100 using a predicted motion vector according to an example embodiment of the present invention.

The motion vector encoding apparatus 100 includes a block divider 110, a predicted motion vector generator 140, a motion estimator 150, a differential unit 195, and an entropy encoder 190, and may further include a motion compensator 160, a differential unit 165, a spatial transformer 170, and a quantizer 180 when encoding video texture.

The block divider 110 divides an input frame into blocks, each of which is an allocation unit of the motion vector, in a size of a macroblock or sub-macroblock. The macroblock is a block with a pixel size of 16×16, and the sub-macroblock is a block with a smaller size than the macroblock. In H.264, the sub-macroblock includes a 16×8 block, an 8×16 block, and an 8×8 block. The 8×8 block may be again divided into an 8×4 block, a 4×8 block, and a 4×4 block.

Further, in the case of a high-quality image exceeding a high-definition television (HDTV) class, the input frame (or input picture) may include coding units (CUs) having pixel sizes of 32×32, 64×64, and 128×128. Each CU has a square shape, and may vary in size of 2N×2N (unit: pixel). Inter-prediction, intra-prediction, transform, quantization, and entropy encoding may be performed on the basis of the CU. The CU may include a largest coding unit (LCU) and a smallest coding unit (SCU). Sizes of the LCU and SCU can be expressed by values, which are a power of 2 and which are equal to or greater than 8. The CU may have a recursive tree structure.

The recursive structure may be represented by a series of flags. For example, when the flag of $CU_k$ having a hierarchical level or depth of k is set to 0, the coding of the $CU_k$ is performed in the current hierarchical level or depth. When the flag is set to 1, the CUk having the current hierarchical level or depth of k is split into four independent $CU_{k+1}$, each of which has a hierarchical level or depth of k+1 and a size of $N_{k+1} \times N_{k+1}$. In this case, $CU_{k+1}$ can be represented by a sub-CU of $CU_k$. $CU_{k+1}$ can be processed in a recursive manner until the hierarchical level or depth of $CU_{k+1}$ reaches a maximum allowable hierarchical level or depth. When the hierarchical level or depth of $CU_{k+1}$ is equal to the maximum allowable hierarchical level or depth, splitting is no longer allowed.

Figure 2:
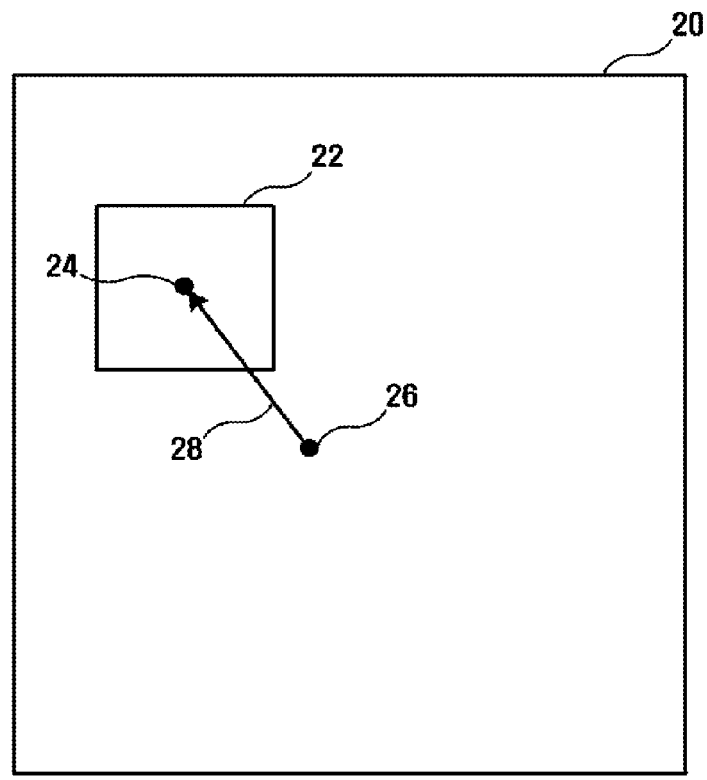
FIG. 2 shows a concept of searching for a motion vector on the basis of a search initial value.

The sizes of the LCU and SCU may be included in a sequence parameter set (SPS). The SPS may include the maximum allowable hierarchical level or depth of the LCU. For example, in FIG. 2, if the maximum allowable hierarchical level or depth is 5, and when the size of one side of the LCU is 128 (unit: pixel), five kinds of CU sizes are possible: 128×128 (LCU), 64×64, 32×32, 16×16, and 8×8 (SCU). In other words, when the size of the LCU and the maximum allowable hierarchical level or depth of the LCU are given, the allowable sizes of the CU can be determined.

Once the hierarchical splitting process as described above is completed, the inter-prediction or the intra-prediction can be performed on leaf nodes of the CU hierarchical tree without further splitting. This leaf CU is used as a basic unit of the inter-prediction or the intra-prediction, i.e. a prediction unit (PU).

For the inter-prediction or the intra-prediction, partitioning may be performed on the leaf CU. That is, the partitioning is performed on the PU. Here, the PU refers to the basic unit for the inter-prediction or the intra-prediction. However, the PU may be used as an existing macroblock unit or sub-macroblock unit, or as an expanded macroblock unit or CU which is equal to or greater than the pixel size of 32×32.

The partitioning for the inter-prediction or the intra-prediction may be symmetric partitioning or asymmetric partitioning.

Referring to FIG. 5 again, in an example embodiment of the present invention, the block divider 110 may divide the input frame into the blocks having the hierarchical structure as in the H.264 standard or the blocks having a fixed size (e.g. 16×16, 8×8, 4×4) as targets for the motion estimation. Hereinafter, the block that acts as a target for performing the motion estimation, i.e. obtaining the motion vectors is defined as a current block, a frame to which the current block belongs as a current frame, and the frame to which reference is made in the motion estimation of the current block as a reference frame.

The predicted motion vector generator 140 generates adjacent motion vectors of the current block with respect to each of the plurality of reference frames, and then generates each predicted motion vector of the current block from the generated adjacent motion vectors. In particular, the predicted motion vector generator 140 generates motion vectors, which are present at locations on one reference frame and which are obtained by an interpolating process based on the motion vectors of the neighboring blocks of the current block, as the adjacent motion vectors. Here, the neighboring blocks may include blocks on the left, upper, and upper right sides of the current block. The median calculation is preferably used to generate the predicted motion vector of the current block from the generated adjacent motion vectors. However, the other calculations such as mean-value calculation may be used.

This interpolating process has been illustrated with reference to FIG. 4, but it will be arranged again as follows.

First, when the reference distance of the motion vector of the neighboring block is equal to or greater than the interval between one reference frame and the current block, the adjacent motion vector is generated by a value made by multiplying the motion vector of the neighboring block by a ratio dividing the interval by the reference distance.

Second, when the reference distance of the motion vector of the neighboring block is less than the interval between one reference frame and the current block, the adjacent motion vector is generated by continuously tracing the location to which the motion vector of the neighboring block points. That is, the displacement between the region centering on the traced location in a specific reference frame and the neighboring block can be determined as the adjacent motion vector. For example, the adjacent motion vector associated with the neighboring block 60 in the frame N−3 is obtained from the displacement between the region 69 centering on the traced location in the frame N−3 and the neighboring block 60.

Finally, the predicted motion vector generator 140 provides the predicted motion vector $MV_p$ of each reference frame to the motion estimator 150 as the search initial value for the motion estimation.

The motion estimator 150 performs the motion estimation adopting the provided predicted motion vector as the search initial value 24. In detail, the motion estimator 150 searches for a region in the reference frame most matched with the current block while moving within the search region 22 (FIG. 2) (in unit of pixel or sub-pixel), and determines a displacement between the current block and the region as the motion vector (MV) when the matching occurs. As a criterion of determining the matching, sum of absolute differences (SAD) that represents an error between the current block and the region, or rate-distortion (R-D) cost that considers even a real coding result may be used. However, since example embodiment of the present invention is based on multiple frame references, the motion estimator 150 results in determining a final motion vector $MV_f$ of the current block and a number Fr_No of the final reference frame corresponding to the final motion vector $MV_f$ for the search regions of the plurality of reference frames.

The differential unit 195 obtains a motion vector difference (MVD) between the final motion vector $MV_f$ of the current block and a final predicted motion vector $MV_{pf}$ that corresponds to the determined final reference frame among the predicted motion vectors $MV_p$. The MVD and information about the final reference frame (e.g. the frame number Fr_No) are losslessly encoded by the entropy encoder 190.

Meanwhile, the motion vector compressing process has been described above, but the motion vector encoding apparatus 100 may additionally encode video texture. In this case, the motion vector encoding apparatus 100 further includes a motion compensator 160, a differential unit 165, a spatial transformer 170, and a quantizer 180.

The motion compensator 160 performs motion compensation on each reference frame using the motion vectors of the blocks provided from the motion estimator 150, thereby obtaining a motion compensated frame.

Further, the differential unit 165 differentiates the motion compensated frame, which compensates each reference frame by the motion vectors, from the input frame, thereby obtaining a residual frame.

Although not shown in FIG. 5, the reference frame may be stored in a frame memory (not shown) in the motion vector encoding apparatus.

The spatial transformer 170 transforms the residual frame into a frequency domain using predetermined spatial transform. As this spatial transform, discrete cosine transform (DCT) is mainly used, or wavelet transform is sometimes used. A coefficient obtained by the spatial transform is referred to as a transform coefficient. When the DCT is used as the spatial transform, the transform coefficient is referred to as a DCT coefficient. When the wavelet transform is used as the spatial transform, the transform coefficient is referred to as a wavelet coefficient.

The quantizer 180 quantizes the transform coefficient obtained by the spatial transformer 170. The quantizing process refers to a process of dividing the transform coefficient expressed by an arbitrary real number value by a constant section, representing each of the divided transform coefficients by a discrete value, and matching it with a predetermined index. Particularly, when the wavelet transform is used as the spatial transform, embedded quantization may be used as the quantization.

The entropy encoder 190 losslessly encodes the transform coefficient quantized by the quantizer 180, along with the MVD and the reference frame number, thereby generating an output bitstream. This lossless coding includes arithmetic coding, variable length coding, Huffman coding, and so on.

Figure 6:
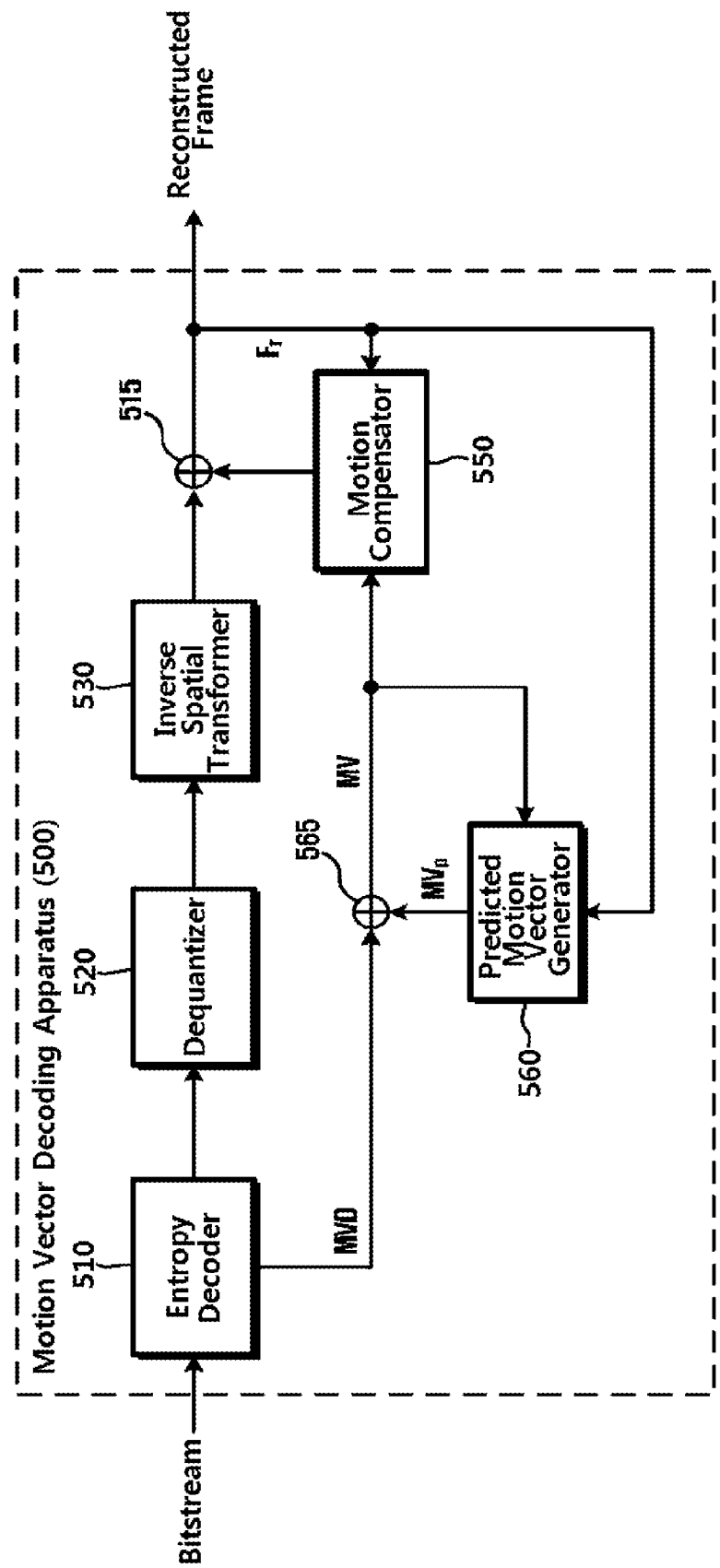
FIG. 6 is a block diagram showing construction of a motion vector decoding apparatus according to an example embodiment of the present invention.

FIG. 6 is a block diagram showing construction of a motion vector decoding apparatus 500 according to an example embodiment of the present invention. The motion vector decoding apparatus 500 includes an entropy decoder 510, a predicted motion vector generator 560, and an adder 565. When having a function of reconstructing video texture, the motion vector decoding apparatus 500 may further include a dequantizer 520, an inverse spatial transformer 530, a motion compensator 550, and an adder 515.

The entropy decoder 510 losslessly decodes an input bitstream to obtain the MVD of the current block and the reference frame number Fr_No.

The predicted motion vector generator 560 generates adjacent motion vectors of the current block on the reference frame corresponding to the reference frame number Fr_No using the motion vectors of the neighboring blocks of the current block, and generates a predicted motion vector of the current block from the generated adjacent motion vectors. A process of generating this predicted motion vector is similar that of the motion vector encoding apparatus 100. However, in the case of the motion vector decoding apparatus 500, since the reference frame number has already been provided, it is sufficient to generate only the predicted motion vector associated with the reference frame number. In contrast, the motion vector encoding apparatus 100 generates the predicted motion vector with respect to each reference frame to be encoded.

In detail, the predicted motion vector generator 560 generates motion vectors, which are present at locations on the reference frame and which are obtained by an interpolating process based on the motion vectors of the neighboring blocks of the current block, as the adjacent motion vectors. This interpolating process has been illustrated with reference to FIG. 4, but will be arranged again as follows.

First, when the reference distance of the motion vector of the neighboring block is equal to or greater than the interval between one reference frame and the current block, the adjacent motion vector is generated by a value made by multiplying the motion vector of the neighboring block by a ratio dividing the interval by the reference distance.

Second, when the reference distance of the motion vector of the neighboring block is less than the interval between one reference frame and the current block, the adjacent motion vector is generated by continuously tracing the location to which the motion vector of the neighboring block points. In detail, the adjacent motion vector is obtained by the displacement between the region centering on the traced location in one reference frame and the neighboring block.

The adder 565 adds the MVD and the generated predicted motion vector of the current block to obtain the final motion vector of the current block. The final motion vector obtained in this way may be used to reconstruct a residual image.

The motion vector decoding apparatus 500 may further include a dequantizer 520, an inverse spatial transformer 530, a motion compensator 550, and an adder 515 in order to reconstruct the video texture.

The entropy decoder 510 extracts texture data along with the MVD and the reference frame number. The extracted texture data is provided to the dequantizer 520.

The dequantizer 520 dequantizes the texture data transmitted from the entropy decoder 510. The dequantizing process refers to a process of searching for the quantization coefficient matched with the value expressed and transmitted by the predetermined index at the stage of the video encoder 100 (or motion vector encoding apparatus 100). A table representing a matching relation between the indices and the quantization coefficients may be transmitted from the stage of the video encoder 100 (or motion vector encoding apparatus 100), and be previously set by a promise between the motion vector encoding apparatus and the motion vector decoding apparatus.

The inverse spatial transformer 530 inversely performs spatial transform, and transforms the coefficient (frequency domain) generated by the dequantization into a residual block in a spatial domain. For example, when the spatial transform is performed on the basis of the wavelet transform at the stage of the video encoder (or motion vector encoding apparatus), the inverse spatial transformer 530 will perform inverse wavelet transform. When the spatial transform is performed on the basis of the DCT at the stage of the video encoder (or motion vector encoding apparatus), the inverse spatial transformer 530 will perform inverse DCT.

The motion compensator 550 performs the motion compensation on the previously reconstructed frame Fr using the final motion vector provided from the adder 565, thereby generating a motion compensated frame.

The adder 515 adds the residual block reconstructed by the inverse spatial transformer 530 and the corresponding image in the motion compensated frame provided from the motion compensator 550 to reconstruct the current block. A total sum of the current blocks reconstructed in this way may be formed into one reconstructed frame.

According to a motion vector decoding method in a video coding scheme in which multiple references are allowed according to another to another example embodiment of the present invention, first, an input bitstream is losslessly decoded to generate an MVD of a current block. A predicted motion vector of the current block is generated using motion vectors of neighboring blocks of the current block. An original image is reconstructed using the MVD and the generated predicted motion vector of the current block.

According to the motion vector decoding method according to another example embodiment of the present invention, in the video coding scheme in which multiple references are allowed, when the motion vectors of the encoded neighboring blocks—the left block "Left", the upper block "Upper", and the upper right block "UpperRight"—whose motion vectors have already been determined (FIG. 3), indicate different reference pictures (or frames), the motion vectors of the neighboring blocks are normalized according to a distance between the motion vector of each neighboring block and the current picture, and thereby it is possible to obtain the predicted motion vector. That is, the predicted motion vector can be obtained using the normalized motion vectors of the neighboring blocks. In detail, the predicted motion vector can be obtained through the median calculation of the normalized motion vectors of the neighboring blocks.

Here, the motion vector of each neighboring block can be normalized by dividing a distance from the current picture (frame) to the current block by a distance from the current picture to the neighboring block. The normalization may be applied to P pictures and B pictures.

Here, the neighboring blocks may be formed in a square shape by symmetric partition. Further, the neighboring blocks may be formed by asymmetric partition. An example of the neighboring block formed by the asymmetric partition may be a rectangular block.

According to a motion vector decoding method in a video coding scheme in which multiple references are allowed according to another example embodiment of the present invention, a process of generating a predicted motion vector of the current block using motion vectors of neighboring blocks of the current block may include a process of generating adjacent motion vectors of the current block using the motion vectors of the neighboring blocks of the current block, and a process of generating the predicted motion vector of the current block from the generated adjacent motion vectors.

Further, a process of losslessly decoding the input bitstream to generate an MVD of the current block may further include a process of losslessly decoding the input bitstream to obtain a reference picture number of the current block. The process of generating the adjacent motion vectors of the current block using the motion vectors of the neighboring blocks of the current block may include a process of generating the adjacent motion vectors of the current block on a reference picture corresponding to the reference picture number using the motion vectors of the neighboring blocks of the current block.

The process of generating the adjacent motion vectors of the current block on the reference picture corresponding to the reference picture number using the motion vectors of the neighboring blocks of the current block may include a process of generating motion vectors, which are present at locations on the reference picture and are obtained by an interpolating process based on the motion vectors of the neighboring blocks of the current block, as the adjacent motion vector, wherein the neighboring blocks include blocks on left, upper, and upper right sides of the current block.

In the interpolating process, when the reference distance of the motion vector of the neighboring block is equal to or greater than an interval between the reference picture and the current block, the adjacent motion vector can be obtained by a value made by multiplying the motion vector of the neighboring block by a ratio. The ratio divides the interval by the reference distance.

In the interpolating process, when the reference distance of the motion vector of the neighboring block is less than the interval between the reference picture and the current block, the adjacent motion vector can be obtained by continuously tracing a location to which the motion vector of the neighboring block points. The adjacent motion vector can be obtained by a displacement between a region centering on the traced location in the reference picture and the neighboring block.

A process of reconstructing an original image using the MVD and the generated predicted motion vector of the current block may include a process of adding the MVD and the generated predicted motion vector of the current block to reconstruct the original image.

The process of generating the predicted motion vector of the current block from the generated adjacent motion vectors may be performed by median calculation.

Up to now, each component of FIGS. 5 and 6 may refer to software or hardware such as a field-programmable gate array (FPGA) or an application-specific integrated circuit (ASIC). However, these components are not limited to the software or hardware, and thus may be constructed so as to be present in an addressable storage medium or to enable one or more processors. Functions provided within the components can be implemented by subdivided components or one component that combines a plurality of components to perform a specific function.

According to example embodiment of the present invention, in comparison with a conventional motion vector prediction technique, since more accurate motion vector prediction is possible without overhead of a bitstream, it is possible to reduce the amount of calculation in the event of motion estimation and to improve video coding efficiency.

While the invention has been shown and described with reference to certain example embodiments thereof, it will be understood by those skilled in the art that various changes in form and details may be made therein without departing from the spirit and scope of the invention as defined by the appended claims. Therefore, it is to be understood that the embodiments described herein are illustrative in every respect and not restrictive.

What is claimed is:
1. A decoding method of a decoding device, comprising:
  decoding, by the decoding device, an input bitstream to generate a motion vector difference for a current block;

interpolating, by the decoding device, a motion vector of a first neighboring block of the current block based on a first distance and a second distance to generate a first interpolated motion vector, wherein the first neighboring block and the current block are in a current picture, the first distance is a distance between a reference picture of the first neighboring block and the current picture, the second distance is a distance between a reference picture of the current block and the current picture, and the motion vector of the first neighboring block is used to decode the first neighboring block according to the reference picture of the first neighboring block, wherein the reference picture of the first neighboring block is different from the reference picture of the current block;

interpolating, by the decoding device, a motion vector of a second neighboring block of the current block based on a third distance and a fourth distance to generate a second interpolated motion vector, wherein the second neighboring block is in the current picture, the third distance is a distance between a reference picture of the second neighboring block and the current picture, the fourth distance is a distance between a reference picture of the current block and the current picture, and the motion vector of the second neighboring block is used to decode the second neighboring block according to the reference picture of the second neighboring block, wherein the reference picture of the second neighboring block is different from the reference picture of the current block;

predicting, by the decoding device, a motion vector of the current block based on the first interpolated motion vector and the second interpolated motion vector to generate a predicted motion vector; and adding, by the decoding device, the predicted motion vector and the motion vector difference to generate the motion vector of the current block.

2. The decoding method of claim 1, further comprising:
performing, by the decoding device, a motion compensating by using the motion vector of the current block to generate a motion compensated block of the current block; and
adding, by the decoding device, a residual block of the current block and the motion compensated block of the current block to reconstruct the current block.

3. The decoding method of claim 1, wherein at least one of the first neighboring block and the second neighboring block is formed in a rectangular shape by asymmetric partition.

4. The decoding method of claim 1, wherein interpolating the motion vector of the first neighboring block comprises:
interpolating the motion vector of the first neighboring block of the current block based on the first distance and the second distance to generate the first interpolated motion vector, when the first distance is equal to or greater than the second distance.

5. The decoding method of claim 1, wherein the first neighboring block is one of a left block, an upper block, and a right upper block of the current block.

6. The decoding method of claim 1, wherein the second neighboring block is one of a left block, an upper block, and a right upper block of the current block.

7. The decoding method of claim 1, wherein the first neighboring block is a left block of the current block, and the second neighboring block is one of an upper block, and a right upper block of the current block.

8. The decoding method of claim 1, wherein predicting the motion vector of the current block comprises:

selecting one among a plurality of interpolated motion vectors including the first interpolated motion vector and the second interpolated motion vector as the predicted motion vector.

9. The decoding method of claim 8, wherein selecting one among the plurality of the interpolated motion vectors comprises:
selecting a median value among the plurality of the interpolated motion vectors including the first interpolated motion vector and the second interpolated motion vector as the predicted motion vector.

10. A decoding device, comprising:
a decoder configured to decode an input bitstream to generate a motion vector difference for a current block;
a prediction motion vector generator configured to:
interpolate a motion vector of a first neighboring block of the current block based on a first distance and a second distance to generate a first interpolated motion vector, wherein the first neighboring block and the current block are in a current picture, the first distance is a distance between a reference picture of the first neighboring block and the current picture, the second distance is a distance between a reference picture of the current block and the current picture, and the motion vector of the first neighboring block is used to decode the first neighboring block according to the reference picture of the first neighboring block, wherein the reference picture of the first neighboring block is different from the reference picture of the current block;
interpolate a motion vector of a second neighboring block of the current block based on a third distance and a fourth distance to generate a second interpolated motion vector, wherein the second neighboring block is in the current picture, the third distance is a distance between a reference picture of the second neighboring block and the current picture, the fourth distance is a distance between a reference picture of the current block and the current picture, and the motion vector of the second neighboring block is used to decode the second neighboring block according to the reference picture of the second neighboring block, wherein the reference picture of the second neighboring block is different from the reference picture of the current block, and
predict a motion vector of the current block based on the first interpolated motion vector and the second interpolated motion vector to generate a predicted motion vector; and
a first adder configured to add the predicted motion vector and the motion vector difference to generate the motion vector of the current block.

11. The decoding device of claim 10, further comprising:
a motion compensator configured to perform a motion compensating by using the motion vector of the current block to generate a motion compensated block of the current block; and
a second adder configured to add a residual block of the current block and the motion compensated block of the current block to reconstruct the current block.

12. The decoding device of claim 10, wherein at least one of the first neighboring block and the second neighboring block is formed in a rectangular shape by asymmetric partition.

13. The decoding device of claim 10, wherein a prediction motion vector generator is configured to interpolate the motion vector of the first neighboring block of the current block based on the first distance and the second distance to generate the first interpolated motion vector, when the first distance is equal to or greater than the second distance.

14. The decoding device of claim 10, wherein the first neighboring block is one of a left block, an upper block, and a right upper block of the current block.

15. The decoding device of claim 10, wherein the second neighboring block is one of a left block, an upper block, and a right upper block of the current block.

16. The decoding device of claim 10, wherein the first neighboring block is a left block of the current block, and the second neighboring block is one of an upper block, and a right upper block of the current block.

17. The decoding device of claim 10, wherein the prediction motion vector generator is configured to select one among a plurality of interpolated motion vectors including the first interpolated motion vector and the second interpolated motion vector as the predicted motion vector.

18. The decoding device of claim 17, wherein the prediction motion vector generator is configured to select a median value among the plurality of the interpolated motion vectors including the first interpolated motion vector and the second interpolated motion vector as the predicted motion vector.

19. An encoding method of an encoding device, comprising:
   interpolating, by the encoding device, a motion vector of a first neighboring block of the current block based on a first distance and a second distance to generate a first interpolated motion vector, wherein the first neighboring block and the current block are in a current picture, the first distance is a distance between a reference picture of the first neighboring block and the current picture, the second distance is a distance between a reference picture of the current block and the current picture, and the motion vector of the first neighboring block is used to encode the first neighboring block according to the reference picture of the first neighboring block, wherein the reference picture of the first neighboring block is different from the reference picture of the current block;
   interpolating, by the encoding device, a motion vector of a second neighboring block of the current block based on a third distance and a fourth distance to generate a second interpolated motion vector, wherein the second neighboring block is in the current picture, the third distance is a distance between a reference picture of the second neighboring block and the current picture, the fourth distance is a distance between a reference picture of the current block and the current picture, and the motion vector of the second neighboring block is used to encode the second neighboring block according to the reference picture of the second neighboring block, wherein the reference picture of the second neighboring block is different from the reference picture of the current block;
   predicting, by the encoding device, a motion vector of the current block based on the first interpolated motion vector and the second interpolated motion vector to generate a predicted motion vector of the current block;
   generating, by the encoding device, the motion vector of the current block; and
   encoding, by the encoding device, a difference between the motion vector of the current block and the predicted motion vector of the current block.

20. The encoding method of claim 19, wherein the first neighboring block is one of a left block, an upper block, and a right upper block of the current block.

* * * * *